United States Patent
Fang et al.

(10) Patent No.: US 9,924,532 B2
(45) Date of Patent: Mar. 20, 2018

(54) BUFFER STATUS REPORTING IN SMALL CELL NETWORKS

(71) Applicant: FUJITSU LIMITED, Kawasaki-shi, Kanagawa (JP)

(72) Inventors: Yiwei Fang, High Wycombe (GB); Timothy Moulsley, Caterham (GB); Zhaojun Li, Guildford (GB); Paul Bucknell, Brighton (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/984,606

(22) Filed: Dec. 30, 2015

(65) Prior Publication Data

US 2016/0119945 A1    Apr. 28, 2016

Related U.S. Application Data

(63) Continuation of application No. PCT/EP2014/053713, filed on Feb. 26, 2014.

(30) Foreign Application Priority Data

Jul. 11, 2013    (EP) .................................... 13176091

(51) Int. Cl.
*H04W 72/12*    (2009.01)
*H04W 28/02*    (2009.01)
*H04W 74/00*    (2009.01)

(52) U.S. Cl.
CPC ... *H04W 72/1284* (2013.01); *H04W 28/0278* (2013.01); *H04W 74/004* (2013.01)

(58) Field of Classification Search
CPC ......... H04W 72/1284; H04W 28/0278; H04W 74/004

(Continued)

(56) References Cited

U.S. PATENT DOCUMENTS

2006/0223544 A1*   10/2006   Lee .................... H04W 76/002
                                                                    455/450
2010/0111023 A1    5/2010   Pelletier et al.
(Continued)

FOREIGN PATENT DOCUMENTS

EP            2343945 A2      7/2011
EP            2 391 172 A2    11/2011
(Continued)

OTHER PUBLICATIONS

Notice of Preliminary Rejection issued by the Korean Intellectual Property Office for corresponding Korean Patent Application No. 10-2015-7036807, dated Jun. 17, 2016, with English translation.
Extended European search report with supplementary European search report and the European search opinion issued by the European Patent Office for corresponding European Patent Application No. 13176091.0, dated Nov. 18, 2013.
(Continued)

*Primary Examiner* — Cong Tran
(74) *Attorney, Agent, or Firm* — Myers Wolin, LLC

(57) ABSTRACT

The invention provides for association of data streams (and/or logical channels) with individual carriers (cells), and independent buffer status reporting per carrier for terminals with more than one uplink carrier configured. In a "Small Cell" scenario for 3GPP LTE, a terminal may be simultaneously served by a macro cell and one or more small cells. These may operate at different frequencies, have different traffic loading and support different QoS (Quality of Service). The invention allows independent control of traffic on the uplinks to the macro cell and the small cells, which can be used to optimize the user experience in relation to the available resources at any given time/location, and allows particular data to be routed via particular cells.

15 Claims, 6 Drawing Sheets

(58) Field of Classification Search
USPC .................. 455/436–439, 442, 444, 434.4; 370/331–332
See application file for complete search history.

(56) References Cited

U.S. PATENT DOCUMENTS

| | | | |
|---|---|---|---|
| 2011/0243085 A1* | 10/2011 | Seo ................. | H04W 52/40 370/329 |
| 2012/0039278 A1 | 2/2012 | Park et al. | |
| 2012/0099452 A1 | 4/2012 | Dai et al. | |
| 2012/0201226 A1* | 8/2012 | Sambhwani ......... | H04B 7/022 370/332 |
| 2012/0208578 A1* | 8/2012 | Jeong ............... | H04W 52/244 455/501 |
| 2013/0034069 A1 | 2/2013 | Uemura et al. | |
| 2013/0176988 A1 | 7/2013 | Wang et al. | |
| 2013/0225182 A1* | 8/2013 | Singh ............... | H04W 36/245 455/444 |
| 2013/0250855 A1* | 9/2013 | Bhattad ............. | H04J 11/0069 370/328 |
| 2013/0288689 A1* | 10/2013 | Choi-Grogan .... | H04W 36/0083 455/444 |
| 2014/0078971 A1* | 3/2014 | Bontu .............. | H04W 8/005 370/329 |
| 2014/0120967 A1* | 5/2014 | Purnadi ............ | H04W 72/1226 455/501 |
| 2014/0161086 A1* | 6/2014 | Tamura ............. | H04W 72/14 370/329 |
| 2014/0342748 A1* | 11/2014 | Zou ................. | H04W 72/0426 455/452.1 |
| 2015/0223138 A1* | 8/2015 | Mohan ............. | H04W 24/02 455/440 |

FOREIGN PATENT DOCUMENTS

| | | |
|---|---|---|
| JP | 2011-205242 A | 10/2011 |
| JP | 2012-507960 A | 3/2012 |
| JP | 2012-528495 A | 11/2012 |
| JP | 2013-520096 A | 5/2013 |
| KR | 10-2012-0025615 A | 3/2012 |
| KR | 10-2013-0006603 A | 1/2013 |
| WO | 2011/100673 A1 | 8/2011 |
| WO | 2011100492 A1 | 8/2011 |
| WO | 2013/113390 A1 | 8/2013 |

OTHER PUBLICATIONS

International Search Report with Written Opinion of the International Searching Authority issued for corresponding International Patent Application No. PCT/EP2014/053713, dated Feb. 26, 2014.
Al-Shibly et al., "Carrier Aggregation in Long Term Evolution-Advanced", 2012 IEEE Control and System Graduate Research Colloquium (ICSGRC 2012), pp. 154-159, copyright 2012 IEEE.
Shen et al., "Overview of 3GPP LTE-Advanced Carrier Aggregation for 4G Wireless Communications", IEEE Communications Magazine, pp. 122-130, Feb. 2012.
3GPP TR 36.913 V11.0.0 "3rd Generation Partnership Project; Technical Specification Group Radio Access Network; Requirements for further advancements for Evolved Universal Terrestrial Radio Access (E-UTRA) (LTE-Advanced) (Release 11)", Sep. 2012.
ETSI TS 136 211 V10.4.0, "LTE; Evolved Universal Terrestrial Radio Access (E-UTRA); Physical channels and modulation (3GPP TS 36.211 version 10.4.0 Release 10)", Jan. 2012.
ETSI TS 136 300 V8.12.0, "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)", Apr. 2010.
ETSI TS 136 321 V11.2.0, "LTE; Evolved Universal Terrestrial Radio Access (E-UTRA); Medium Access Control (MAC) protocol specification (3GPP TS 36.321 version 11.2.0 Release 11)", Apr. 2013.
ETSI TS 136 331 V11.3.0, "LTE; Evolved Universal Terrestrial Radio Access (E-UTRA); Radio Resource Control (RRC); Protocol specification (3GPP TS 36.331 version 11.3.0 Release 11)", Apr. 2013.
ETSI TS 136 213 V105.0, "LTE; Evolved Universal Terrestrial Radio Access (E-UTRA); Physical layer procedures (3GPP TS 36.213 version 10.5.0 Release 10)", Mar. 2012.
Samsung, "On BSR for REL-10", Agenda Item: 7.1.2, 3GPP TSG-RAN WG2 Meeting #69bis, R2-102459, Beijing, China, Apr. 12-16, 2010.
Notification of Reasons for Refusal issued by the Japan Patent Office for corresponding Japanese Patent Application No. 2016-524708, dated May 9, 2017, with an English translation.
Notice of second Final Rejection issued by the Korean Intellectual Property Office for corresponding Korean Patent Application No. 10-2015-7036807 dated Aug. 30, 2017, with an English translation.

* cited by examiner

BUFFER STATUS REPORTING IN SMALL CELL NETWORKS

CROSS REFERENCES TO RELATED APPLICATIONS

This application is a continuation of Application PCT/EP2014/053713, filed Feb. 26, 2014, which claims priority from the European Patent Application No. 13176091.0, filed Jul. 11, 2013, the contents of each are herein wholly incorporated by reference.

FIELD OF THE INVENTION

The present invention relates to cellular wireless networks, particularly to so-called Small Cell networks and more particularly to the transmission by terminals of scheduling requests in such networks.

BACKGROUND OF THE INVENTION

Cellular wireless networks are widely known in which base stations (BSs) communicate with terminals (also called user equipments (UEs), or subscriber or mobile stations) within range of the BSs. The geographical areas covered by base stations are generally referred to as cells, and typically many BSs are provided in appropriate locations so as to form a network or system covering a wide geographical area more or less seamlessly with adjacent and/or overlapping cells. (In this specification, the terms "system" and "network" are used synonymously except where the context requires otherwise). In each cell, the available bandwidth is divided into individual resource allocations for the user equipments which it serves. Communications in the network comprise downlink communications from the base station to the terminal, and uplink communications from the terminal to the base station. Data to be transmitted in the uplink, in the form of a data stream comprising a sequence of data packets, may be user data or control data and may have different QoS (Quality of Service) requirements, depending on the application or purpose.

Basic LTE Network

One type of cellular wireless network is based upon the set of standards referred to as Long-Term Evolution (LTE). The current version of the standard, Release 11, is also referred to as LTE-A (LTE-Advanced). The network topology in LTE is illustrated in FIG. 1. As can be seen, each terminal 1, called a UE in LTE, connects over a wireless link via a Uu interface to a base station in the form of an enhanced node-B or eNodeB 11. It should be noted that various types of eNodeB are possible. An eNodeB may support one or more cells at different carrier frequencies having differing transmit powers and different antenna configurations, and therefore providing coverage areas (cells) of differing sizes. Multiple eNodeBs deployed in a given geographical area constitute a wireless network called the E-UTRAN (and henceforth generally referred to simply as "the network"). Cells in an LTE network can operate either in a Time Division Duplex, TDD, mode in which the uplink and downlink are separated in time but use the same carrier frequency, or Frequency Division Duplex, FDD, in which the uplink and downlink occur simultaneously at different carrier frequencies.

Each eNodeB 11 in turn is connected by a (usually) wired link using an interface called S1 to higher-level or "core network" entities 101, including a Serving Gateway (S-GW), and a Mobility Management Entity (MME) for managing the system and sending control signalling to other nodes, particularly eNodeBs, in the network. In addition (not shown), a Packet Data Network (PDN) Gateway (P-GW) is present, separately or combined with the S-GW, to exchange data packets with any packet data network including the Internet. Thus, communication is possible between the LTE network and other networks.

Small Cell Network (SCN)

FIG. 1 shows what is sometimes called a "homogeneous network"; that is, a network of base stations in a planned layout and which have similar transmit power levels, antenna patterns, receiver noise floors and similar backhaul connectivity to the core network. Current wireless cellular networks are typically deployed as homogeneous networks using a macro-centric planned process. The locations of the base stations are carefully decided by network planning, and the base station settings are properly configured to maximise the coverage and control the interference between base stations. However, it is widely assumed that future cellular wireless networks will adopt a "heterogeneous network" structure composed of two or more different kinds of cell, also (and henceforth) referred to as a Small Cell Network or SCN.

FIG. 2 depicts a simple SCN. The large ellipse 10 represents the coverage area or footprint of a Macro cell provided by a base station (Macro BS) 11. The smaller ellipses 20, 22 and 24 represent Small cells within the coverage area of Macro cell 10, each having a respective base station (exemplified by Pico BS 21). Here, the Macro cell is a cell providing basic "underlay" coverage in the network of a certain area, and the Small cells are overlaid over the Macro cell, using the same or different carrier frequencies for capacity boosting purposes particularly within so-called "hot spot zones". A UE 1 is able to communicate both with Macro BS 11 and Pico BS 21 (but not necessarily simultaneously) as indicated by the arrows in the Figure. When a UE starts to use a given cell for its communication, that cell is said to be "activated" for that UE, whether or not the cell is already in use by any other UEs. Incidentally, although the Macro and Small cells are depicted here as being provided by different base stations, this is not essential and the same base station may be responsible for both a Macro cell and a Small cell. For example, a cell operating in a higher frequency band is likely to experience greater pathloss, and thus have shorter range, than one in a lower frequency band; thus the same base station may provide both a lower-frequency Macro cell and a higher-frequency Small cell.

Although only two types of cell are shown in FIG. 2, various types of Small cell may be present in a SCN including (in decreasing order of size), cells similar to current Micro, Pico and Femto cells. Femto and Pico cells can be overlaid on either Macro or Micro cells. Thus, networks can be designed such that the Macro cells provide blanket coverage while the Micro, Pico and/or Femto cells (or Small Cells) provide additional capacity. The envisaged Small Cells may also correspond to a New Carrier Type (NCT) not yet defined in LTE specifications.

Carrier Aggregation (CA)

SCNs will support and enhance various capacity-boosting schemes to be applied to UEs, including so-called Carrier Aggregation (CA) which has been introduced into 3GPP (in the homogeneous network context) since LTE Release 10. Details of CA as applied to LTE are given in the 3GPP standard TS36.300, hereby incorporated by reference.

In CA, two or more Component Carriers (CCs) at different carrier frequencies are aggregated in order to support wider transmission bandwidths up to 100 MHz (made up of a maximum of five CCs each having a bandwidth around their carrier frequency of up to 20 MHz). A UE may simultaneously receive or transmit on one or multiple CCs depending on its capabilities.

Management of connections of UEs to the network, broadcast of system information and establishment of radio bearers is part of Radio Resource Control (RRC). When CA is configured, the UE only has one RRC connection with the network. At RRC connection establishment/re-establishment/handover, one serving cell provides the system information which the UE needs to join the network, and this cell is referred to as the Primary Cell (PCell). All other CCs are called Secondary Cells or SCells. Generally, one carrier corresponds to one cell. In the downlink, the carrier corresponding to the PCell is the Downlink Primary Component Carrier (DL PCC) while in the uplink it is the Uplink Primary Component Carrier (UL PCC). Incidentally, in this specification the terms "carrier" and "cell" are used somewhat interchangeably; it should be borne in mind, however that although different carrier frequencies always imply different cells, the reverse is not necessarily the case: a single carrier frequency can support one or more cells.

Therefore, a UE using CA has a plurality of serving cells, one for each CC, and the CCs may for example correspond to Macro and Small cells in a SCN, such that the same UE may use the Macro cell as its "primary" cell (PCell) and a Small cell as a "secondary" cell (SCell). As well as possibly having different carrier frequencies, the Macro and Small cells may have different bandwidths. Generally, each cell is provided by base station antennas at a single site, but this does not exclude the possibility of one cell being provided by antennas at different sites.

A potential issue with CA in SCNs is that at least some of the CCs are likely to be provided by small base stations similar to existing Home eNodeBs and femtocells, which use broadband internet for their backhaul connectivity to the network, and are therefore liable to incur greater latency (including a greater time taken to exchange information with other base stations) compared with macro cell eNodeBs.

Where the CCs are provided by geographically-separated base stations, these base stations will also generally experience different signal propagation delays from the UE. In order to take advantage of CA in the SCN scenario, Release 11 of LTE provides for multiple uplink Timing Advances (TAs), by which a UE can ensure that its uplink transmissions arrive in synchronization with transmissions from other UEs at the base stations providing the cells. Since the same base station may provide more than one cell, the concept of a Timing Advance Group (TAG) is used to group together carriers with the same TA value. However, various aspects of how CA may be most advantageously applied to the SCN have yet to be determined, as explained later.

Uplink Channels in LTE

Since the embodiments to be described concern buffer status reports (BSRs) in SCNs, some further explanation will be given of the nature of, and need for, these status reports.

An LTE system is a scheduled system in which transmission is organized in "frames" each containing twenty slots, two consecutive slots being referred to as a "subframe". For each transmission time interval of one or more subframes, a new scheduling decision is taken regarding which UEs are assigned/allocated to which time/frequency/spatial/code resources during this transmission time interval.

Several "channels" for data and signalling are defined at various levels of abstraction within the network. FIG. 3 shows some of the channels defined in LTE-based systems at each of a logical level, transport layer level and physical layer level, each corresponding to a different protocol layer within the well-known OSI model, and the mappings between them. For present purposes, the uplink channels are of particular interest.

In FIG. 3, physical channels defined in the uplink are a Physical Random Access Channel (PRACH), a Physical Uplink Shared Channel (PUSCH), and a Physical Uplink Control Channel (PUCCH). An uplink physical channel corresponds to a set of resources carrying information originating from higher layers. In addition to the uplink channels, uplink signals such as reference signals, primary and secondary synchronization signals are typically defined.

At the transport channel level in FIG. 3, an uplink shared channel UL-SCH maps to the physical channel PUSCH whilst a random access channel RACH maps to the above mentioned PRACH. Incidentally, although FIG. 3 shows logical channels, these define set of logical channel types for different kinds of data transfer services as offered by the MAC, where each logical channel type is defined by what type of information is transferred. It should be noted that in this invention logical channels refer to the logical channels used in the logical channel Prioritisation procedure in the MAC where the actual logical channels are defined by RRC configuration.

The above mentioned 3GPP TS 36.300 provides an overall description of the radio interface protocol architecture used in LTE-based systems and in particular section 5.2 of 3GPP TS 36.300 relates to uplink transmission schemes. The physical channels in the uplink of LTE-based systems are described, for example, in 3GPP TS 36.211, section 5, which is hereby also incorporated by reference.

User data and optionally also higher-level control signalling is carried on the Physical Uplink Shared Channel PUSCH. The physical uplink control channel PUCCH carries uplink control information such as a scheduling request (SR), see below, and a channel quality indicator (CQI) report. As illustrated in FIG. 3, there is a downlink counterpart channel to the PUCCH, which is the Physical Downlink Control Channel (PDCCH) for carrying, in response to the scheduling request, an uplink scheduling grant. Incidentally, in LTE-A there is also an enhanced PDCCH called EPDCCH, which allows coordination among eNodeBs for reducing inter-cell interference.

The uplink scheduling grant also indicates the transmission rate (i.e. modulation and code rate). If PUSCH transmission occurs when the PUCCH would otherwise be transmitted, the control information to be carried on PUCCH may be transmitted on PUSCH along with user data. Simultaneous transmission of PUCCH and PUSCH from the same UE may be supported if enabled by higher layers. The PUCCH may support multiple formats as indicated in 3GPP TS 36.211, section 5.4.

Because transmissions between UE and base station are prone to transmission errors due to interference, a procedure is available for each packet sent in uplink and downlink direction to be acknowledged by the receiver. This is done by sending Hybrid Automatic Repeat Request (HARQ) acknowledgments or non-acknowledgments (ACK/NACK) on control channels. On the downlink, ACK/NACK is sent on a Physical HARQ Indicator Channel (PHICH). On the uplink ACK/NACK is sent on PUCCH.

The Physical Random Access Channel PRACH is used to carry the Random Access Channel (RACH) for accessing the network if the UE does not have any allocated uplink transmission resource. If a scheduling request (SR) is triggered at the UE, for example by arrival of data for transmission on PUSCH, when no PUSCH resources have been allocated to the UE, the SR is transmitted on a dedicated resource for this purpose. If no such resources have been allocated to the UE, the RACH procedure on PRACH is initiated.

Channels in CA

Having outlined some of the more important channels defined in LTE, their relationship to cells/CCs in the CA scenario can now be described using FIG. 4.

As shown in FIG. 4, under current LTE proposals, each PCell can transmit PDCCH to a UE. An SCell may (or may not) provide PDCCH to a UE, depending on UE capabilities; however, uplink data on PUSCH, and BSR and some RACH can be transmitted by a UE having the required capabilities, on both PCell and SCell. Correspondingly there is a separate transport channel UL-SCH for each cell. For LTE up to and including Release 11 the uplink control channel (PUCCH), which supports SR, is only transmitted on the PCell. Similarly, PRACH for scheduling requests is only transmitted on the PCell. However, these restrictions may not apply in future Releases.

If an SCell does not carry PDCCH, this implies that the scheduling information for that cell has to be carried in PDCCH of another cell (typically the PCell)—so called cross-carrier scheduling. The PCell and SCells should have identical or very similar transmission timing which allows, for example, PDCCH on one cell to schedule resources on a different cell, and ACK/NACKs for PDSCH transmissions on SCells to be sent on the PCell. SCells may have different transmission timing at the UE in order to allow for the possibility that the cells are supported by antennas at different geographical sites. A PCell and/or SCells with the same timing would belong to the same TAG (Time Alignment Group). However, because of the tight timing synchronization requirements between PUCCH on the PCell and PDSCH on the SCells, PCells and SCells can be assumed to be controlled by the same eNodeB.

Radio Bearers and Logical Channels

In an OSI-compliant standard such as for LTE, protocol layers defined in the system (i.e. E-UTRAN) include Packet Data Control Protocol (PDCP), Radio Link Control (RLC) and Medium Access Control (MAC). FIG. 5 shows the major uplink functions in the system at each of the PDCP, RLC and MAC protocol layers when employing CA. FIG. 5 shows the case of two component carriers CC1 and CC2, corresponding to a PCell and SCell for example. With respect to a given node (for example an eNodeB or UE), each protocol can be considered to reside in a functional module or "entity" which can be considered separately from protocols in other layers. This allows, among other things, for the use of the concept of "radio bearers", which provide a kind of tunnel between peer entities in the eNodeB and UE at a given protocol level for user data or control signalling. Establishment and maintenance of radio bearers is another aspect of RRC.

Packets belonging to the same radio bearer get the same end-to-end treatment in the network. A bearer can be characterised by parameters such as "Guaranteed Bit Rate" (GBR) and "non-GBR". For GBR bearers, the network guarantees a certain bit rate to be available for the bearer at any time. The bearers, both GBR and non-GBR are further characterized by a Maximum Bit Rate (MBR), which limits the maximum rate that the network will provide for the given bearer. In this way it is possible for each radio bearer to provide a certain quality of service, QoS appropriate to a data stream carried on the radio bearer.

In LTE/E-UTRAN, the above mentioned radio bearers (RBs) are defined at various protocol levels including PDCP. There are three kinds of PDCP bearers: SRB (Signalling Radio Bearer) and two kinds of DRB (Dedicated Radio Bearer), AM DRB and UM DRB where AM stands for Acknowledged Mode RLC and UM for Unacknowledged Mode. In E-UTRAN there are only three SRBs—SRB0, SRB1 and SRB2. These are used by control plane protocol to send the packets to the UE. DRBs are used for sending voice and data; as many DRBs are set up as the number of QoS streams or services required by the terminal. When a DRB is set up, a Logical Channel Identity (LCID) will be assigned to this DRB for UL and DL. In this sense, it may be said that one logical channel (LC) conventionally corresponds to one RB.

For the purpose of resource allocation, the logical channels may in turn be assigned to Logical Channel Groups (LCGs), LCs of similar QoS demands (QoS Class Identifier, and/or priority (QCI)) being placed in the same LCG. Each LC is assigned to only one LCG and the assignment of an LC to a LCG may be done on the basis of required quality of service (e.g. priority, delay requirements). The primary motivation for defining LCGs is to reduce the amount of control signalling compared with providing control signalling for each individual LC.

The LC may be assigned to the RB, and LC may be assigned to a LCG, when the RB is set up; however it may be useful to reassign LCs to LCGs for example when a new RB is added or an existing RB is removed.

The MAC layer, apart from managing the above-mentioned hybrid ARQ function, is responsible for mapping of data between the logical channels to transport channels, each of which may carry more than one LC. Transport channels DL-SCH and UL-SCH represent data transfer services offered by the PHY and are defined by how the information is carried, different physical layer modulations and the way they are encoded.

A MAC entity of the eNodeB in an LTE system includes a scheduling function responsible for managing resource scheduling for both uplink and downlink channels, that is, to allocate physical layer resources for the DL-SCH and UL-SCH transport channels. Different schedulers operate for the DL-SCH and UL-SCH. The scheduler should take account of the traffic volume (buffer status) and the QoS requirements of each UE and associated radio bearers, when sharing resources between UEs. Schedulers may assign resources taking account the radio conditions at the UE identified through measurements made at the eNodeB and/or reported by the UE. Likewise, the UE has a MAC entity with a scheduling function for, in accordance with a resource allocation signalled to it by the eNodeB, constructing transport blocks from data for transmission which has arrived in a buffer of the UE.

In the scenario of CA within LTE, as can be seen from FIG. 5, the multi-carrier nature of the physical layer is only exposed to the MAC layer for which a separate UL-SCH is provided by each CC (serving cell) and one HARQ entity is required per serving cell.

The relationship (mapping) between radio bearers, logical channels/LCGs, and transport channels is summarised in FIG. 8, in which the downward direction represents the progression from higher-level to lower-level protocol layers.

Thus, at the top of the protocol stack is an application running on the UE, a camera application or Voice over IP (VoIP) for example. This generates a data stream such as photographs or voice packets to be uploaded to the network. Each data stream has an associated QoS requirement. In the example of a camera application, a "best effort" service would suffice; on the other hand VoIP would have a more stringent QoS requirement to minimise latency. The data stream maps to a radio bearer (DRB) which in turn corresponds to a logical channel. Thus, a data stream may be mapped to one logical channel (although LTE specifications do not prevent mapping a data stream to more than one logical channel), and the logical channel may be assigned to a logical channel group. Transport channels are constructed from the logical channels and transmitted on the uplink physical channels.

Buffer Status Report (BSR) and Scheduling Request (SR)

Based on the current 3GPP standard as set out in TS36.300, measurement reports, including transport volume and measurements of a UE's radio environment, are required to enable the scheduler in the eNodeB to operate in both uplink and downlink. Especially, in the uplink direction, uplink buffer status reports (BSR), including information on buffer status for different logical channels, are needed from the UEs to provide support for QoS-aware packet scheduling by the eNodeB.

That is, in order to schedule uplink transmissions efficiently the network needs to be aware of the amount (volume) of data that the UE needs to transmit, the priority of such data (in the form of data streams of different types and priorities, reflecting different services being provided to the UE), and the uplink channel conditions. In LTE specifications this is provided for by the UE sending BSRs (buffer status reports) along with data transmissions via PUSCH, and by transmission of UL sounding reference signals (SRS).

A BSR indicates the amounts of data buffered at the UE (i.e., ready for transmission on the uplink) with respect to either one or four Logical Channel Groups. In LTE the LCGs are processed with different priorities. Thus, the concept of LCGs allows the BSR to provide information on data amounts categorised by priority. Four LCGs and two formats are used for reporting in the uplink:

A short format for which only the buffer status of one LCG is reported;

A long format for which buffer statuses of all four LCGs are reported.

The short format is shown in FIG. 6 and the long format is shown in FIG. 7. As indicated in FIG. 6, one specific LCG identified by the first field "LCG ID", the amount of data being signified by the second field, "Buffer Size". In the long format BSR shown in FIG. 7, it will be noted that explicit LCG IDs are not used, the LCG concerned being implicit from the relative position of the Buffer Size field within the report. If not all four LCGs are configured then the UE simply reports "0" (zero) for the status of any non-configured LCG.

However, if the UE has no PUSCH resources available, there is no means to send a BSR. In such cases a scheduling request (SR) is triggered in the UE. The SR indicates that the UE needs to be granted UL resources on PUSCH. In some cases the UE may not have an SR resource allocation on PUCCH, and then the RACH procedure is initiated as already mentioned. A BSR supersedes the SR in the sense that when a SR is triggered, it is considered as pending until it is cancelled by transmission of a BSR which contains buffer status up to (and including) the last event that triggered a BSR, or when the UL grant(s) can accommodate all pending data available for transmission.

The BSR and SR protocols are further described in 3GPP TS 36.321, sections 5.4.4, 5.4.5, and 6.1.3, and the SR procedure for a terminal procedure for determining physical uplink control channel assignment is described in 3GPP TS 36.213, section 10, which is also hereby incorporated by reference.

To summarise the foregoing, currently in LTE buffer status reports are used to indicate to the network information about the data ready to be transmitted from the terminal in the uplink. Data streams corresponding to logical channels are associated with logical channel groups, and depending on the arrival and priority of new data, a buffer status report (BSR) may be triggered. If no (PUSCH) resources are available to carry a BSR, a scheduling request (SR) may be transmitted. If no resources for SR are allocated, then a random access (RACH) transmission may take place. In the 3GPP specifications a data stream may be considered to correspond to a radio bearer, which would include both signalling radio bearers (SRB) and data radio bearers (DRB).

In Carrier Aggregation (CA), in addition to the PCell one or more SCells at different carrier frequencies may be configured for a UE. The PCell and SCells should have identical or very similar transmission timing, which allows, for example, PDCCH on one cell to schedule resources on a different cell, and ACK/NACKs for PDSCH transmissions on SCells to be sent on the PCell. Uplink transmissions from the UE via each SCell may have different transmission timings at the UE in order to allow for the possibility that the cells are supported by antennas at different geographical sites. A PCell and/or SCells with the same timing would belong to the same TAG (Time Alignment Group). However, because of the tight timing synchronization requirements between PUCCH on the PCell and PDSCH on the SCells, PCells and SCells can be assumed to be controlled by the same eNodeB.

For a given UE, the SCells may be activated or deactivated by MAC signalling. A terminal may be capable of uplink operation on two (or more) carriers. Therefore in CA, uplink data on PUSCH, and BSR and some RACH can be transmitted by both PCell and SCell. For LTE up to and including Release 11 the uplink control channel (PUCCH), which supports SR, is only transmitted on the PCell. Similarly, PRACH for requesting an UL resource allocation is only transmitted on PCell. PRACH may be transmitted on an SCell, but only for the purpose of determining timing advance. However, these restrictions may not apply in future Releases.

One key scenario for the "Small Cell" concept, which is currently being studied in 3GPP, provides for the possibility of a terminal being supported by both a macro cell and one or more small cells, operating at the same or different carrier frequencies. This has some similarities with CA, but the timing relation between the cells may be less strictly controlled for small cells, and the cells may be controlled by different eNodeBs. It is likely that cells at significantly different frequencies (as envisaged for one of the small cells scenarios) would have different channel conditions and traffic capacities. The small cell carrier may have higher data rate capacity, but less consistent geographical coverage. In addition the backhaul capacity and latency may be different for macro cells and small cells. Therefore, under the Small Cell concept it would be advantageous for the network to be able to control both which data traffic from a given UE is routed via each carrier, and the arrangements for reporting uplink buffer status and scheduling requests, depending on channel conditions, which are likely to vary with time and location.

WO 2011/100673 A1 discloses a wireless communication method, wireless communication network, terminal and base station according to the preamble of each independent claim. When a terminal is connected with multiple eNBs (sites) with one or more UL CCs to each site, one CC per site being defined as an anchor carrier, and one anchor carrier being defined as a primary CC, the corresponding UL anchor carrier associated with the eNB may be used for sending UL control information such as ACK/NACK and channel state information. Alternatively, all UL control information may be sent using the primary CC.

EP 2 391 172 A2 discloses a BSR scheme for a LTE MIMO system in which a single eNB communicates with a UE, using either of the above mentioned BSR formats of FIGS. 6 and 7.

WO 2013/113390 A1 discloses a BSR scheme for a CA system in LTE in which either BSR is transmitted on both PCell and SCell in case both are scheduled, or alternatively the UE sends BSR on the allocated PUSCH as per Release-10 but with BSR cancellation on a CC basis, i.e. BSR for a given serving cell is considered pending until is not transmitted on the corresponding cell.

SUMMARY OF THE INVENTION

According to a first aspect of the present invention, there is provided a wireless communication method wherein:
    a terminal transmits first and second data streams to a network, the network providing a plurality of cells serving the terminal; characterised in that the first data stream is associated with a both a first one and a second one of said cells, and the second data stream is associated with a second one of said cells; and
    the terminal transmits to the network at least one signalling message including first information relating to data to be sent in the first data stream and/or second information relating to data to be sent in the second data stream.

Preferably, the terminal determines via which of the cells to send the at least one signalling message. In this case, the terminal may make the determination based at least on channel conditions with respect to each cell.

In an embodiment, one such signalling message is transmitted via the first cell. Another such signalling message may be transmitted via the second cell.

On the other hand, two of the signalling messages may both be transmitted via the same cell.

The signalling messages in the present invention may take various forms. They may include a buffer status report, a scheduling request, or a PRACH signature.

Preferably each data stream is further associated with a logical channel and/or a logical channel group.

The association between a data stream and a cell may be changed by signalling from the network to the terminal.

The first and second cells may be controlled by different base stations.

According to a second aspect of the present invention, there is provided a wireless communication network providing a plurality of cells serving a terminal, the terminal arranged to transmit first and second data streams to the network, characterised in that the first data stream is associated with a both a first one and a second one of said cells, and the second data stream is associated with a second one of said cells; and
    the terminal is further arranged to transmit to the network at least one signalling message including first information relating to data to be sent in the first data stream, and/or second information relating to data to be sent in the second data stream.

According to a third aspect of the present invention, there is provided a terminal in a wireless communication network, the network providing a plurality of cells serving the terminal, the terminal arranged to transmit first and second data streams to the network, characterised in that
    the first data stream is associated with a both a first one and a second one of said cells, and the second data stream is associated with a second one of said cells; and
    the terminal is further arranged to transmit to the network at least one signalling message including first information relating to data to be sent in the first data stream, and/or second information relating to data to be sent in the second data stream.

According to a fourth aspect of the present invention, there is provided a base station providing at least one serving cell of a terminal having a plurality of serving cells, the cells used by the terminal to transmit first and second data streams, characterised in that
    the first data stream is associated with a both a first one and a second one of said cells, and the second data stream is associated with a second one of said cells; and
    the base station is arranged to receive from the terminal at least one signalling message including first information relating to data to be sent in the first data streams, and/or second information relating to data to be sent in the second data stream.

In a further aspect, the present invention provides software in the form of computer-readable instructions which, when executed by a processor of radio equipment, provides the base station or the terminal as defined above. Such software may be recorded on one or more non-transitory storage media.

The term "cell" in this specification is to be interpreted broadly. For example, it is possible to refer to communication channels associated with a cell being transmitted from or by the cell (in the downlink), or transmitted to a cell (in the uplink), even if the transmission or reception is actually carried out by one or more antennas or antenna ports of a base station. Whilst the term "cell" normally implies both a downlink and an uplink, this is not essential and in the present invention at least one cell may be an uplink-only cell. The term "cell" is intended also to include sub-cells, which could be sub-divisions of a cell based on using particular antennas or corresponding to different geographical areas within a cell. References to performing certain actions "at a cell" generally implies performing those actions in a base station which provides that cell.

The cells may be associated with different base stations or with the same base station. The term "base station" itself has a broad meaning and encompasses, for example, an access point or transmission point. The terms "network" and "system" are used interchangeably in this specification and intended to have an equivalent meaning, and the "E-UTRAN" of LTE is one possible network/system to which the present invention may be applied.

The radio bearer, apart from its specific meaning in the context of LTE, can be regarded as a service provided by the access stratum of the cellular wireless network to the non access stratum (core network) for delivering data between a terminal and the core network.

The data streams, information on which is contained in the first and second signalling messages, comprise data in a buffer of the terminal, used to hold data temporarily prior to uplink transmission. In the present invention the signalling messages contain information on data to be sent in the data streams, or more particularly information on logical channels associated with the data streams. A logical channel means some form of designation applied to data within a radio bearer, for example for the purpose of scheduling. Since the logical channels are associated with cells, this allows the buffer status to be reported separately for each cell.

Thus, embodiments of the present invention provide for association of data streams (and/or logical channels) with individual carriers (cells), and independent buffer status reporting per carrier for terminals with more than one uplink carrier configured. This is particularly advantageous in a "Small Cell" scenario for 3GPP LTE, where a terminal may be simultaneously served by a macro cell and one or more small cells. These may operate at different frequencies, have different traffic loading and support different QoS (Quality of Service). Embodiments may allow independent control of traffic on the uplinks to the macro cell and the small cells, which can be used to optimize the user experience in relation to the available resources at any given time/location, and allows particular data to be routed via particular cells.

In general, and unless there is a clear intention to the contrary, features described with respect to one aspect of the invention may be applied equally and in any combination to any other aspect, even if such a combination is not explicitly mentioned or described herein.

As is evident from the foregoing, embodiments of the present invention involve signal transmissions between cells and terminals (UEs) in a wireless communication system. The cells are associated with one or more base stations. A base station may take any form suitable for transmitting and receiving such signals. It is envisaged that the base stations will typically take the form proposed for implementation in the 3GPP LTE and 3GPP LTE-A groups of standards, and may therefore be described as an eNodeB (eNodeB) (which term also embraces Home eNodeB) as appropriate in different situations. However, subject to the functional requirements of the invention, some or all base stations may take any other form suitable for transmitting and receiving signals from terminals.

Similarly, in the present invention, each terminal may take any form suitable for transmitting and receiving signals from base stations. For example, the terminal may take the form of a user equipment (UE), subscriber station (SS), or a mobile station (MS), or any other suitable fixed-position or movable form. For the purpose of visualising the invention, it may be convenient to imagine the terminal as a mobile handset (and in many instances at least some of the terminals will comprise mobile handsets), however no limitation whatsoever is to be implied from this.

BRIEF DESCRIPTION OF THE DRAWINGS

Reference is made, by way of example only, to the accompanying drawings in which.

DETAILED DESCRIPTION

The problem which led the inventors to conceive of the present invention is that the current mechanisms in LTE for reporting uplink buffer status were designed under the assumption of a single uplink carrier for control signalling, and single set of (semi-statically configured) logical channels for uplink data transmission. For the Small Cell case this does not allow data (i.e. logical channels) to be easily distinguished in terms of which uplink carrier would be most appropriate for transmission, and does not allow buffer status reporting and scheduling requests to dynamically depend on which carriers are currently available.

For example, in a typical case a macro cell and a small cell would be controlled by different eNodeBs, which may schedule uplink transmissions independently. In addition at least some uplink control signalling (e.g. UE initiated RRC signalling) is most appropriately sent to the relevant eNodeB. Similarly, if the macro cell and small cells provide different latencies, it would be appropriate to route data for applications requiring low latency (e.g. VoIP) via the appropriate cell. Further, if the macro cell is relatively more heavily loaded, then low priority high volume data should be routed via the small cell.

A principle of embodiments is to enable an association between a data stream (logical channel) and a cell (or more than one cells). The inventors have realised that in LTE this can also be conveniently realised using the existing mapping of logical channels to logical channel groups, but providing a further mapping between logical channel groups and cells. This mapping can be one to many (i.e. data corresponding to a logical channel group can be transmitted on more than one cell). It should be noted that conventionally there is no specified relationship in LTE between LCs/LCGs on one hand, and carriers/cells on the other hand.

Figure 9:
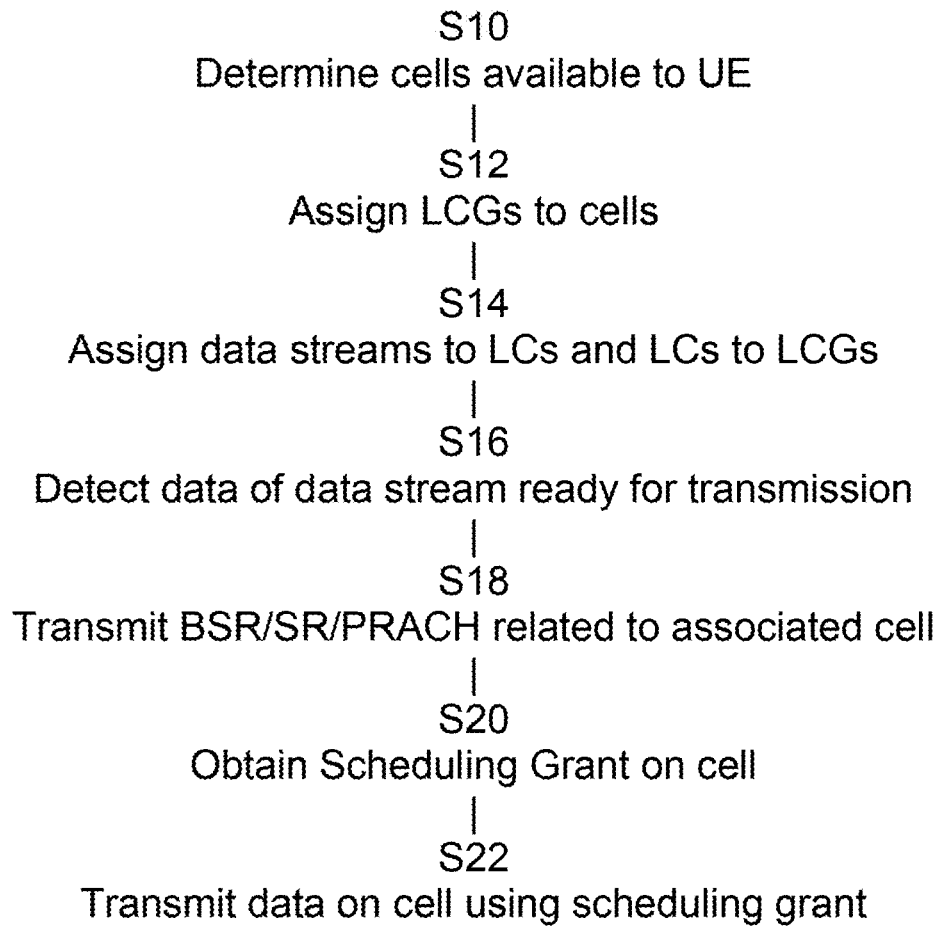
FIG. 9 is a flowchart of steps in a method embodying the present invention.

FIG. 9 shows this principle in the form of a simplified flowchart. First (S10) it is determined which cells are currently available to (activated or prepared for) the UE. In step S12, LCGs are assigned to the available cells. As already mentioned this is not necessarily a one-to-one relationship. In S14, data streams are assigned to logical channels and the logical channels to LCGs. In step S16 the UE detects that there is data waiting for transmission for a particular data stream, and in step S18 it responds to this detection by sending a signalling message (BSR/SR/PRACH) to the network which message relates to the cell (or cells) associated with that data stream. This message may be sent on the cell associated with the data stream, but need not be. In S20, the UE receives a scheduling grant on the relevant cell. Then in step S22 the UE uses the granted resources on that cell to send the waiting data of the data stream.

Having outlined a principle underlying some embodiments of the present invention, the embodiments themselves will now be described.

In general, unless otherwise indicated, the embodiments described below are based on LTE, where the network (wireless communication system) comprises multiple eNodeBs, each controlling one or more downlink cells, each downlink cell having a corresponding uplink cell. Each DL cell may serve one or more terminals (UEs) which may receive and decode signals transmitted in that serving cell. In order to control the use of transmission resources in time, frequency and spatial domains for transmission to and from the UEs, the eNodeB sends control channel messages (PD-CCH or EPDCCH) to the UEs.

A PDCCH/EPDCCH message typically indicates whether the data transmission will be in the uplink (using PUSCH) or downlink (using PDSCH). The resource assignments granted by the eNB in the DL are determined using channel state information. This is provided by feedback from the UE based on channel measurements made using reference signals which may be transmitted by the eNB for each cell that it supports. This feedback typically consists of one or more instances of a data rate in the form of a channel quality indicator (CQI), a precoding matrix indicator (PMI) and rank indicator (RI). It is assumed that a UE is served by a macro cell and one or more small cells.

First Embodiment

In a first embodiment the macro cell and a small cell are each controlled by a different eNodeB. It is determined that a particular data stream (or streams) should be sent via a particular cell (e.g. UE initiated uplink RRC signalling relating to the macro cell only via the macro cell, or low priority user data via the small cell).

Possible factors used for this determination include:—
QoS of the data stream concerned
system bandwidth of cells
channel quality
traffic loading on the cells
latency available on the cells
power consumption at the UE when using a cell
financial cost of using a cell Here, the bandwidth available on a given cell may be indicated to the UE by signalling. The channel quality with respect to a given cell may be estimated from the DL channel quality, or signalled from the base station. The traffic loading on a given cell may be signalled by the base station, or the UE may be able to estimate it. Latency is a function of, among other things, the speed of a backhaul connection between a base station and the rest of the network; it will generally be higher for a small cell (provided for example by a Home eNodeB or equivalent, connected to broadband internet) than for a macro cell (provided by a Macro eNodeB having dedicated links to the core network). Power consumption may vary for the UE depending on the carrier frequency: other things being equal, a higher carrier frequency will raise the power consumption at the UE. The financial cost factor refers to the fact that a cell provided by a macro eNodeB will be subject to a normal usage/data tariff of a mobile operator, whilst a femtocell (or equivalent) might be free to use.

The above determination may be made either by the network, or by the UE with guidance from the network. It will be noted that there is some overlap among these factors; however, it may not be necessary to consider all of the above factors. It may simplify the processing required to consider only the bandwidth for example. Another issue, when the UE makes the determination, is the information available to the UE: the UE may not know the channel quality or the traffic loading. In such cases the bandwidth will give at least an indication to the UE of which cell is a suitable one to carry the data stream.

More particularly, determining the association between data stream and cell may be by specification or network choice (e.g. RRC signalling), depending on the variation of the embodiment. For example the specification may include a rule for determining which data stream is to be transmitted via which cell, possibly expressed in terms of a relationship between radio bearers and LC/LCG. In any case, the various cells which may be available to the UE can conveniently be labelled by the cell ID, which is known to the UE.

Thus a data stream can be associated with a selected cell, and the data transmitted using that cell. This association is achieved by assigning (or mapping) the data stream to a logical channel which is associated with the selected cell, and by assigning the logical channel to a logical channel group which is also associated with the selected cell. This is the same association for both LC and its LCG; in other words both LC and LCG are associated with the same cell. The criteria for sending a BSR, SR or RACH are determined independently per cell, according to the logical channels assigned to that cell.

In a variation of the first embodiment, the assignment of logical channel groups is determined in dependence on which of the configured cells are activated for the UE. It should be noted that "activated" in this context means "capable of use by the specific UE", rather than operational or not. For example, if the small cell is deactivated by MAC signalling, the mapping is changed such that all the logical channel groups are mapped to the macro cell. In such a case, some logical channel groups may not be required. Incidentally, conventionally a given cell is activated for both uplink and downlink. However, independent activation of a cell with respect to a UE's uplink or downlink may be possible in future.

Different sets of logical channel groups may be configured for each possible combination of activated cells. In a given location, the set of cells potentially available is known to the PCell eNodeB and configured at the UE, and will normally be quite limited in number (with even fewer currently activated for a given UE). Consequently it is possible to calculate all possible combinations of cells. Reconfiguration could be performed if a new cell becomes available (for example if a Home eNodeB is powered up).

In a further variation of the first embodiment, configurations for one or more of BSR, SR and PRACH may be different for the macro and small cell. There may be rules to define which cell is used for transmission of these signals, or the UE may decide this, for example based on observation of radio channel conditions (e.g. from measurements on downlink reference symbols).

Two example of such rules are as follows.

(i) If a BSR is triggered due to arrival of data in a particular LC, if the LC is associated with a particular cell, the BSR is transmitted on that cell if PUSCH resource is available in the current subframe. If no PUSCH resource is configured on that cell, then the BSR is transmitted on the cell with highest uplink channel quality for which PUSCH resources are available in the current subframe. If there are no PUSCH resources available on any cell, SR is triggered.

(ii) If an SR is triggered due to arrival of data in a particular LC, if the LC is associated with a particular cell, the SR is triggered on that cell if a SR is configured, otherwise PRACH is transmitted on that cell. If the LC is not associated with a particular cell, and SR resources are configured on more than one cell, the SR is transmitted on the cell with the highest uplink channel quality, or if no SR resources are configured, then PRACH is transmitted on the cell with the highest uplink channel quality.

Second Embodiment

A second embodiment is like the first embodiment, except that the cells operate according to carrier aggregation (CA), extended to allow SR (and PRACH for scheduling requests) to be transmitted on an SCell uplink. As a variation, since the cells are controlled by the same eNodeB, there is less advantage in independent transmission of control signalling such as BSR via the different cells. Therefore a single BSR is defined to cover both uplinks; in other words one signalling message contains individual status reports for two (or more) cells. This may be transmitted on PCell or (in contrast to current LTE specifications), on any SCell uplink.

Figure 7:
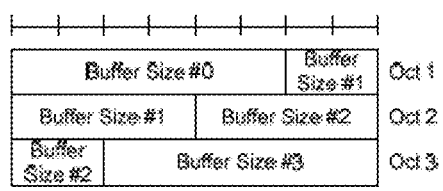
Figure 8:
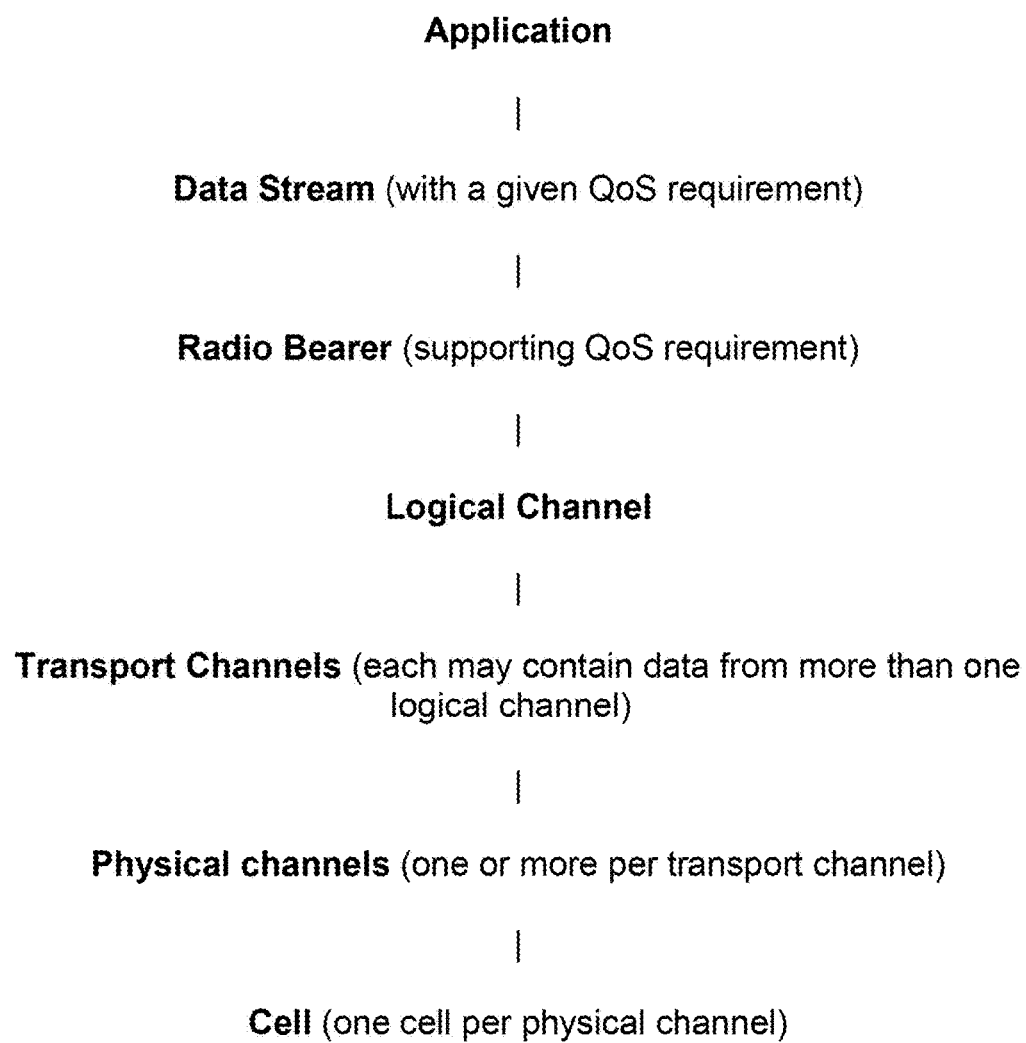
FIG. 8 illustrates the conventional relationship between radio bearers, logical channels and cells in LTE.

Thus, this embodiment allows data streams to be preferentially routed via particular cells, but only needs a single BSR which can cover the data ready to send on both (or all) cells. The existing long-format BSR (FIG. 7) could be used for this purpose, with the fields representing different LCGs and thereby indirectly, as a result of the mapping of LC/LCG to cells, defining which cell(s) to use.

Third Embodiment

A third embodiment (which may be combined with the first and second embodiments) includes a new type of BSR that is split into two parts; one part is the buffer status for UL data that may be transmitted by either macro cell or small cell, and the second part is the buffer status for UL data intended for transmission by the small cell. As already mentioned, the mapping of LC/LCG to cell may be a one-to-many relationship such that a certain LCG can be associated with both cells.

Figure 1:
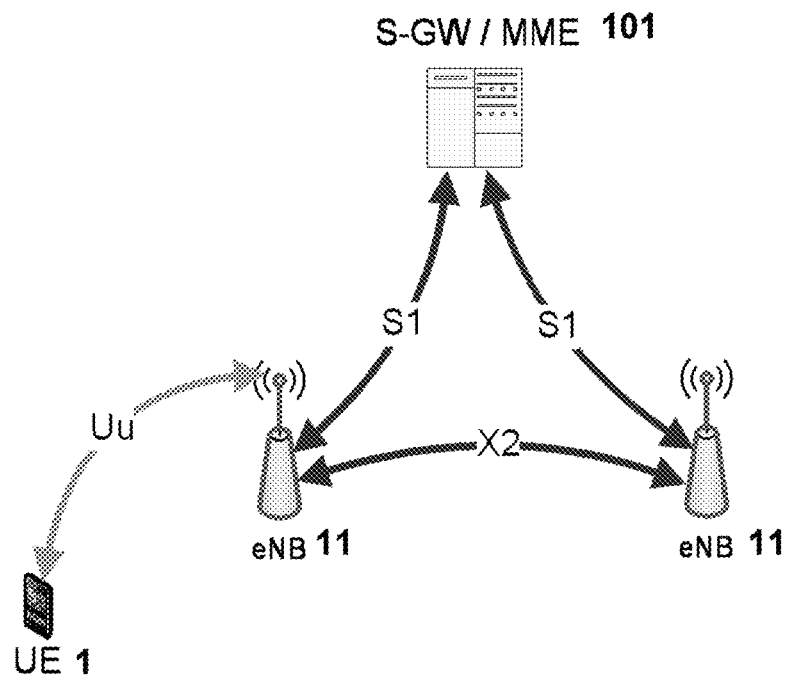
FIG. 1 shows a network topology in LTE.
Figure 2:
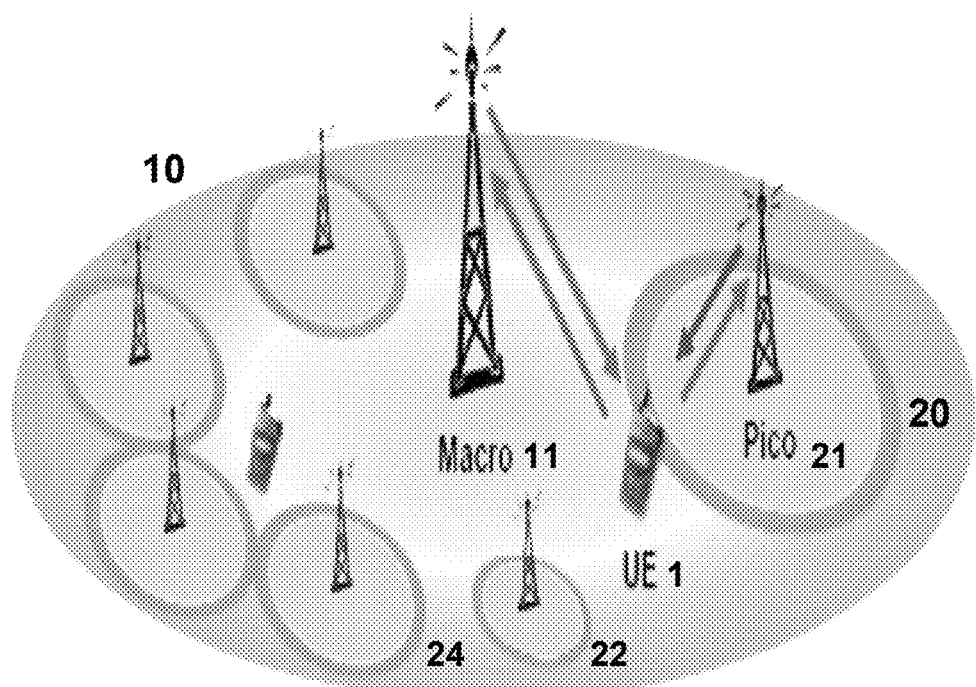
FIG. 2 illustrates the principle of a Small Cell Network (SCN)
Figure 3:
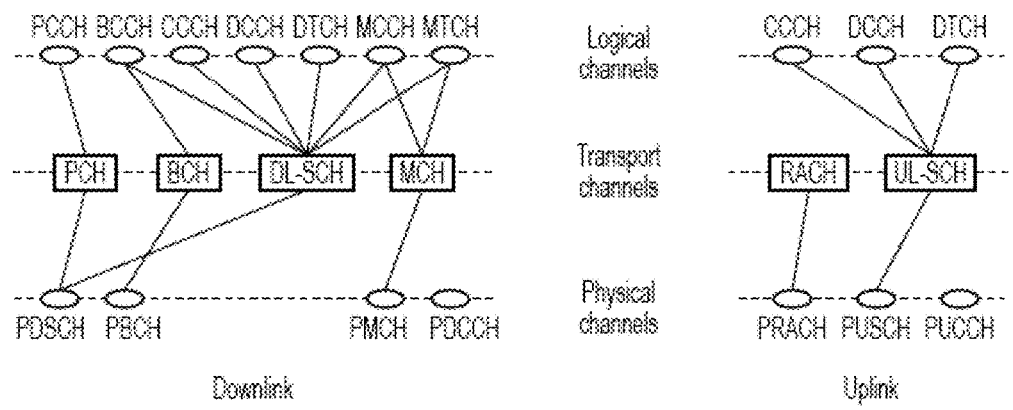
FIG. 3 illustrates channels at each of a plurality of protocol layers in LTE.
Figure 4:
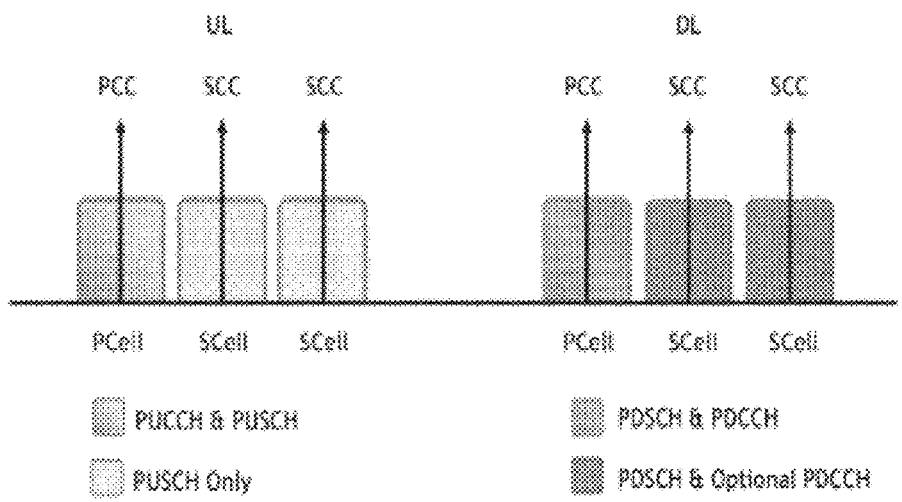
FIG. 4 shows how LTE physical channels are allocated to a PCell and SCell in a SCN.
Figure 5:
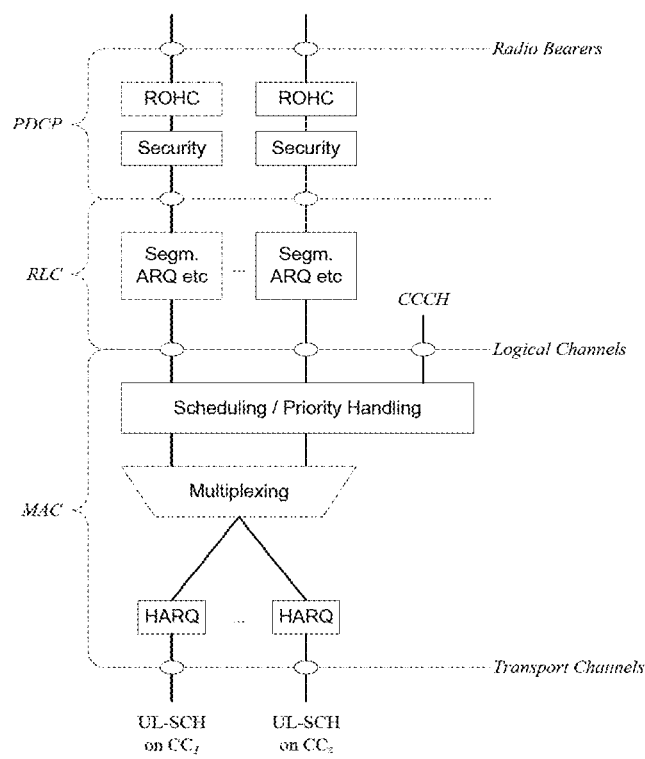
FIG. 5 illustrates a protocol stack for the uplink of a wireless communication system configured for carrier aggregation (CA)
Figure 6:
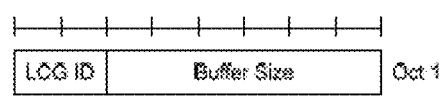
FIGS. 6 and 7 show respectively a short-form and a long form BSR employed in LTE.

In a variation of this embodiment the BSR report is split into three parts. The additional third part is the buffer status for UL data not intended for transmission by the small cell. This may be achieved by configuring one LCG to map only to the PCell (macro cell). Each part may be recognised by the respective relevant macro cell or small cell by means of a tag of one or two bits to signify which cell(s) the BSR applies to; such a tag would also allow parts of the BSR to be sent independently. This scheme would probably require defining an additional BSR format to those of FIGS. 6 and 7.

A further variation of the above embodiment the BSR consists of multiple different parts that can be tagged differently for different small cells. For example, using 2 bits, 4 different tags are available and a BSR could be transmitted in two parts, each with a 2-bit tag.

In variations of this embodiment the parts of the BSR transmitted may be fixed in specification, determined by configuration or decided by the UE. If the UE has no data for a particular LCG, and the corresponding part of the BSR is nevertheless to be transmitted, the UE would simply transmit "0" (zero) in that part.

Fourth Embodiment

A fourth embodiment (which may also be combined with the first three embodiments) does not in itself alter BSR reporting, but allows a change of the cell handling a particular data stream by updating the associated cell ID without changing other settings. For example it would be possible to modify the DRB (data radio bearer) configuration without changing other setting such as DRB-Identity, PDCP-Config, RLC-Config, logicalChannelIdentity and logicalChannelConfig. This may be based on the channel condition in the cells involved for the UE.

In other words, this embodiment allows "renaming" a cell so that the mappings of LCs/LCGs to cells take on a different meaning, and may lead to other changes such as a change of BSR format.

Figure 10:
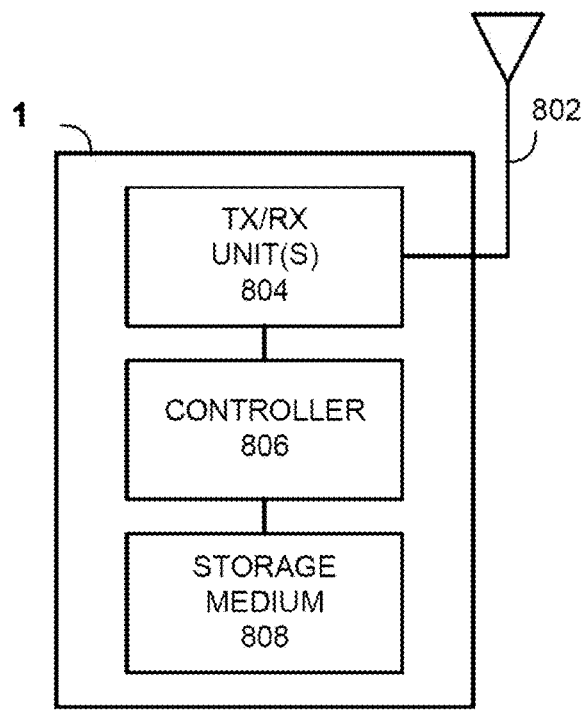
FIG. 10 is a schematic block diagram of a terminal for use in the present invention.

FIG. 10 is a block diagram illustrating an example of a UE 1 to which the present invention may be applied. The UE 1 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The UE 1 includes transmitter/receiver unit(s) 804 connected to at least one antenna 802 (together defining a communication unit) and a controller 806 having access to memory in the form of a storage medium 808. The controller 806 may be, for example, Microprocessor, digital signal processor (DSP), application-specific integrated circuit (ASIC), field-programmable gate array (FPGA), or other logic circuitry programmed or otherwise configured to perform the various functions described above, such as determining the association between data streams (or LCs) and cells in the manner outlined above. For example, the various functions described above may be embodied in the form of a computer program stored in the storage medium 808 and executed by the controller 806. The transmission/reception unit 804 is arranged, under control of the controller 806, to receive signals from the cells such as scheduling grants and so forth as discussed previously.

Figure 11:
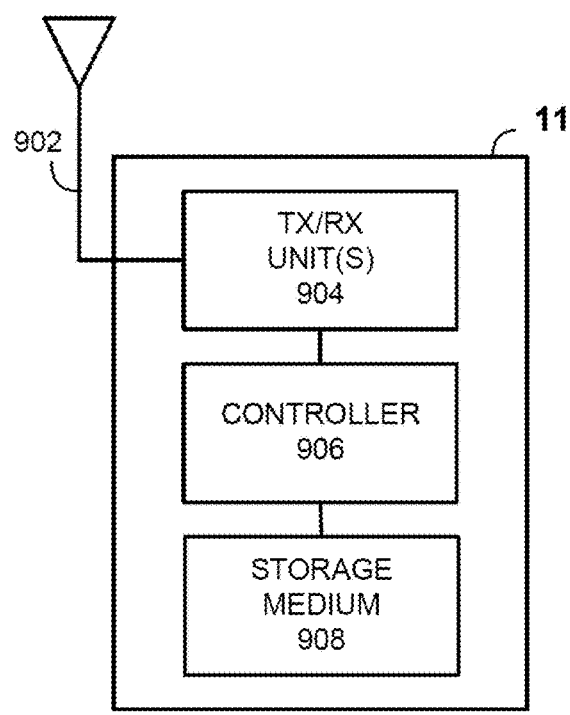
FIG. 11 is a schematic block diagram of a base station for use in the present invention.

FIG. 11 is a block diagram illustrating an example of an eNodeB 11 to which the present invention may be applied. The base station includes transmitter/receiver unit(s) 904 connected to at least one antenna 902 (together defining a communication unit) and a controller 906. The controller may be, for example, Microprocessor, DSP, ASIC, FPGA, or other logic circuitry programmed or otherwise configured to perform the various functions described above, such as determining the association between data streams (or LCs) and cells when this is done on the network side. For example, the various functions described above may be embodied in the form of a computer program stored in the storage medium 908 and executed by the controller 906. The transmission/reception unit 904 is responsible for transmission of configuration information, scheduling grants and so on under control of the controller 906.

To summarise, embodiments of the present invention may provide for association of data streams (and/or logical channels) with individual carriers (cells), and independent buffer status reporting per carrier for terminals with more than one uplink carrier configured.

Various modifications are possible within the scope of the present invention.

As already mentioned, the term "cells" in the above description is to be interpreted broadly. Cells need not each have a different geographical area, or a different base station. In general, cells can be defined on a downlink, uplink, or on both.

Conventionally, as explained above a UE obtains system information from a single PCell, but embodiments of the present invention are not restricted to such an arrangement, and in future it may be possible to regard more than one cell as PCells of the same UE.

At least some of the embodiments described above may employ the existing BSR formats of FIGS. 6 and 7. Alternatively, new BSR formats may be defined if preferred (for example to avoid confusion between existing and novel usages of LCG, where in the present invention the LCG implies the cell).

Normally, in a BSR, information on amounts (volumes) of data in the LCGs is conveyed. However, it is not essential to signify any absolute amount of data. Relative amounts of data among the LCGs and/or percentage fill levels of buffers are other possibilities.

Although in the above embodiments, the LCs are assigned to LCGs along with the step of assigning data streams to LCs, it is not essential to perform these steps at the same time. For example it may be possible to assign LCs to LCGs in advance of the step of assigning data streams to LCs.

The invention is equally applicable to LTE FDD and TDD, and the principle applied to other communications systems such as UMTS. If the invention were to be included in 3GPP specifications for LTE it would probably be in the following form:—
- in 3GPP TS 36.331, new RRC signalling to configure the association between a logical channel group and cell; and
- in 3GPP TS 36.321, new UE behaviour in relation to transmission of BSR/SR/PRACH.

INDUSTRIAL APPLICABILITY

In a "Small Cell" scenario for 3GPP LTE, a terminal may be simultaneously served by a macro cell and one or more small cells. These may operate at different frequencies, have different traffic loading and support different QoS (Quality of Service). By permitting independent buffer status reporting per carrier for terminals with more than one uplink carrier configured, the invention allows independent control of traffic on the uplinks to the macro cell and the small cells, which can be used to optimize the user experience in relation to the available resources at any given time/location, and allows particular data to be routed via particular cells.

What is claimed is:

1. A wireless communication method wherein:
a terminal transmits first and second data streams to a network, the network providing a plurality of cells serving the terminal; wherein
the first data stream is associated with both a first one and a second one of the cells, and the second data stream is associated with a second one of the cells;
the terminal detects that there is data waiting for transmission in at least one of the first and second data streams; and
the terminal transmits to the network at least one signalling message including at least one of a buffer status report, scheduling request and physical random access channel signature relating to the cell or cells associated with the at least one of the first data and second streams.

2. The method according to claim 1 wherein the terminal determines via which of the cells to send the at least one signalling message.

3. The method according to claim 2 wherein the terminal makes said determination based at least on channel conditions with respect to each cell.

4. The method according to claim 1 wherein a said signalling message is transmitted via the first cell.

5. The method according to claim 1 wherein a said signalling message is transmitted via the second cell.

6. The method according to claim 1 wherein two signalling messages are both transmitted via the same cell.

7. The method according to claim 1 wherein the at least one signalling message includes a buffer status report.

8. The method according to claim 1 wherein the at least one signalling message includes a scheduling request.

9. The method according to claim 1 wherein the at least one signalling message includes a PRACH signature.

10. The method according to claim 1 wherein each data stream is further associated with a logical channel and/or a logical channel group.

11. The method according to claim 1 wherein the association between a data stream and a cell is changed by signalling from the network to the terminal.

12. The method according to claim 1 wherein the first and second cells are controlled by different base stations.

13. A wireless communication network providing a plurality of cells serving a terminal, the terminal arranged to transmit first and second data streams to the network, wherein
the first data stream is associated with both a first one and a second one of the cells, and the second data stream is associated with a second one of the cells; and
the terminal is further arranged to detect that there is data waiting for transmission in at least one of the first and second data streams and to transmit to the network at least one signalling message including at least one of a buffer status report, scheduling request and physical random access channel signature relating to the cell or cells associated with the at least one of the first and second data streams.

14. A terminal in a wireless communication network, the network providing a plurality of cells serving the terminal, the terminal arranged to transmit first and second data streams to the network, wherein
the first data stream is associated with both a first one and a second one of the cells, and the second data stream is associated with a second one of the cells; and
the terminal is further arranged to detect that there is data waiting for transmission in at least one of the first and second data streams and to transmit to the network at least one/or signalling message including at least one of a buffer status report, scheduling request and physical random access channel signature relating to the cell or cells associated with the at least one of the first and second data streams.

15. A base station providing at least one serving cell of a terminal having a plurality of serving cells, the cells used by the terminal to transmit first and second data streams, wherein
the first data stream is associated with both a first one and a second one of the cells, and the second data stream is associated with a second one of the cells; and
the base station is arranged to receive from the terminal at least one signalling message including at least one of a buffer status report, scheduling request and physical random access channel signature relating to the cell or cells associated with the at least one of the first and second data streams.

* * * * *